United States Patent [19]

Bell et al.

[11] Patent Number: 5,057,667
[45] Date of Patent: Oct. 15, 1991

[54] AQUARIUM HEATER

[76] Inventors: Mark Bell, 29852 Quail Hollow La., Valley Center, Calif. 92082; Robert S. Alpert, 2227 Summerhill Dr., Encinitas, Calif. 92024

[21] Appl. No.: 385,076

[22] Filed: Jul. 26, 1989

[51] Int. Cl.[5] .............................................. H05B 3/86
[52] U.S. Cl. ........................................ 392/458; 119/5; 219/385; 219/542
[58] Field of Search ............... 219/311, 219, 280, 281, 219/310, 312, 327, 385, 438, 441, 542–544; 119/5

[56] References Cited

U.S. PATENT DOCUMENTS

| | | | |
|---|---|---|---|
| 2,883,307 | 4/1959 | Orr | 219/543 |
| 3,272,900 | 9/1966 | Ryan | 219/543 |
| 3,629,554 | 12/1971 | Stewart | 219/543 |
| 3,842,241 | 10/1974 | Isaacson | 119/5 |
| 4,820,902 | 4/1989 | Gillery | 219/203 |

Primary Examiner—Roy N. Envall, Jr.
Attorney, Agent, or Firm—Selwyn S. Berg

[57] ABSTRACT

An aquarium heating system utilizes a conductive coating on an aquarium glass viewing window to heat the aquarium water. The conductive coating is transparent and is disposed on the surface of at least one viewing window. A voltage is supplied to the conductive coating under control of a power supply which operates to maintain the water at a constant temperature.

1 Claim, 2 Drawing Sheets

AQUARIUM HEATER

BACKGROUND OF THE INVENTION

The present invention relates to an aquarium heating system that utilizes a conductive coating on an aquarium glass viewing window to produce heat. A specific, preferred application of the present invention is to heat the water contained within the aquarium without the use of a submergible heater used currently today.

The invention further relates to an aquarium heating system that measures the heat of the water within the aquarium, compares the temperature with a preset, desired water temperature, and compensates for any differences between the desired temperature and the actual temperature by either causing electrical current to flow or not flow through the conductive glass coating.

Present aquarium heating systems utilize a simple thermostatically controlled heating coil which is typically encapsulated in a glass tube which is then submerged in the water. The heater is usually located near a rear corner of the aquarium, held in place by plastic clips or some sort of clamping device.

A disadvantage of this kind of heater is that the heat is not equally distributed throughout the aquarium because the heat is imparted to the water at a single location. Because heat travels radially from the center of the heater, the water (and fish) closer to the element experience a higher temperature than elsewhere in the tank. This produces an unwanted temperature gradient.

The large amount of tank space occupied by this type of glass enclosed heater represents a further disadvantage of currently available aquarium heaters. This disadvantage becomes most apparent with the smaller five gallon aquariums.

Many species of fish, especially tropical fish, require an elevated (above typical room ambient temperature) water temperature, thus necessitating some sort of water heating system. To date, these systems are expensive ($10 to $30) and aesthetically unacceptable.

SUMMARY OF THE INVENTION

It is a general object of the present invention to provide an aquarium heating system which overcomes the disadvantages of the prior systems described above.

It is a more particular object of the present invention to provide an aquarium water heating system that utilizes a conductive glass coating to produce the required heat.

It is a further object of the present invention to measure the temperature of the water and incorporate a temperature control system which controls the amount of electrical current flowing through conductive glass in order to either heat or not heat the water within the aquarium depending on whether the temperature of the water is above or below a desired temperature.

Another object of the invention is to more evenly heat the water within an aquarium by utilizing conductively coated glass walls of the aquarium as heating elements.

Still another object of the present invention is to reduce the costs associated with aquarium water heating and to greatly improve aquarium aesthetics by eliminating the need for a bulky glass tube type heater.

These objects, as well as further objects which will become apparent from the discussion that follows, are achieved, according to the present invention, by providing a heating system which comprises conductively coated glass that will, when current flows through it, produce heat; a temperature responsive element, in order to obtain a representation of the actual temperature of the water; a device to "set" or "dial-in" a desired temperature; an electronic circuit that determines whether or not and/or in what quantity current should pass through the conductive coating on the glass, based on input from the two aforementioned invention elements.

In a preferred embodiment of the present invention, a tin oxide film ($SnO_2$:F) is disposed on the surface of the glass used to form the conductive coating. This film is transparent and both corrosion and abrasion resistant. Tin oxide can be deposited via chemical vapor deposition.

Indium tin oxide can also be used to produce the conductive surface on the aquarium glass. It, too, is transparent and both corrosion and abrasion resistant. It can be deposited by a sputtering technique.

For a full understanding of the present invention, reference should now be made to the following detailed description of the preferred embodiments of the invention and to the accompanying drawings.

DESCRIPTION OF THE PREFERRED EMBODIMENTS

Heating of the aquarium water is accomplished by causing an electrical current to flow through the exterior surface of the aquarium glass. A tin oxide film, disposed on the outer surface of the aquarium glass by either a spraying technique or a sputtering technique, will cause this surface to become conductive while allowing the glass to remain completely transparent. Although the tin oxide film is conductive, it is not perfectly conductive. Therefore, a certain amount of electrical resistance is present when measured across opposite edges of the tin oxide-treated glass surface.

A tin oxide film disposed on a glass surface can typically yield a resistance range of 2 to 30 ohms per square. When current passes through this resistive film, a certain amount of heat is produced. The heat produced is a function of current, resistance, and physical parameters of the tin oxide coating utilized as resistive elements. The measured resistance of a 3"×3" square piece of glass coated with a tin oxide film will be the same as that of a 4"×4" or larger piece. But for a given amount of electrical current passing through these two "resistors", the smaller piece of glass will yield a higher temperature. This is because the current density will be greater with the smaller piece of coated glass. The ratio of the current to the area of the resistive coating determines the electrical current density and therefore the amount of heat produced. Current density is also affected by the thickness of the tin oxide coating disposed on the surface of the glass. For a given current flowing through a tin oxide coated glass, a thinner coating will yield a higher temperature because of the increased current density.

Depositing tin oxide films, whether using a chemical vapor deposition method or a sputtering technique, is a well known technology. Thickness and resistance per unit square can easily be repeated and controlled. Moreover, tin oxide films can be selectively applied in patterns by employing either a mask (if a chemical vapor deposition method is used) or selectively etching away portions of the film using well known printed circuit board etching techniques.

In the preferred embodiment, glass panels of an aquarium are coated with a tin oxide film on the outside surfaces of the aquarium. Using the inside surfaces of the aquarium is not preferred because of the parallel electrical current paths present in the water. Selection of the inside surfaces would further be unacceptable because of electrolysis problems, unless a non-conductive (e.g. plastic) coating is provided over the tin oxide conductive film.

Because glass exhibits a relatively high thermal conductivity, heating the outside surface of the glass by passing a current through a tin oxide film causes the water within the aquarium to be heated by thermal conduction.

Figure 1:
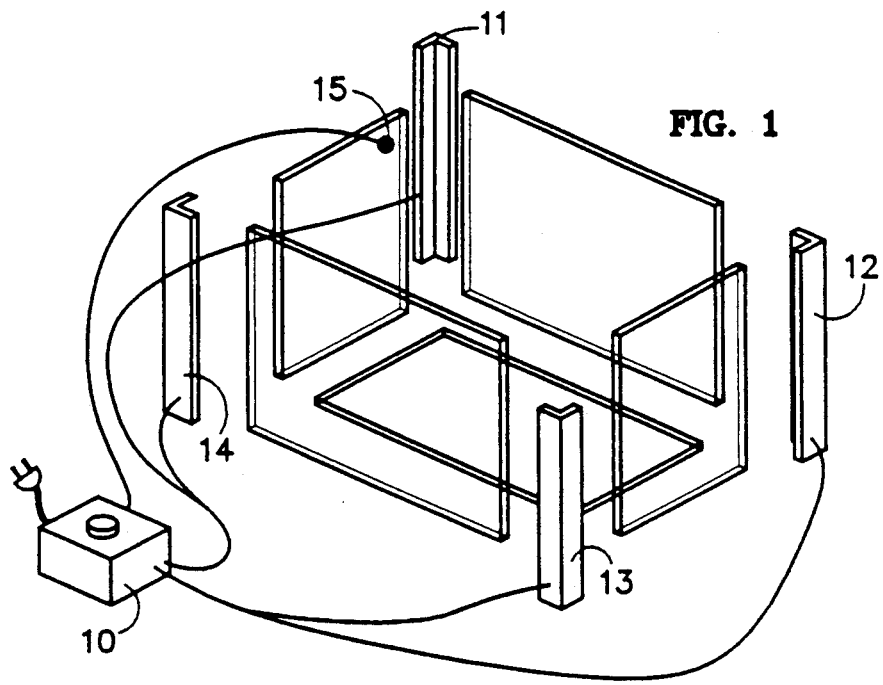
FIG. 1 is an assembly diagram illustrating the principal parts of the aquarium heater according to the present invention.

Many aquariums have right-angle, metal strips at each corner which serve functionally to strengthen the aquarium and serve a decorative function as well. Electrical current can be imparted to the exterior glass surfaces by means of these metal strips which are, in the preferred embodiment, utilized as electrodes. This arrangement is illustrated in FIG. 1.

A power supply 10 external to the aquarium converts 110 volts A.C. to a lower, D.C. voltage which is applied to the tin oxide coating by way of the previously mentioned electrodes. A nominal voltage of 35 volts is applied to electrodes 11 and 12 as well as 13 and 14. The positive side of the power supply is applied to electrodes 11 and 13 while the negative side of the power supply is connected to electrodes 12 and 14.

In order to maintain the water within the aquarium at a constant temperature, a small, temperature responsive element 15 such as a thermistor or thermocouple device is submerged into the water. This component supplies temperature information to the electronic control circuit, allowing the circuit to "decide" whether the water temperature of the aquarium is above or below that preset at the electronic control circuit.

The control circuit, preferably located within the same enclosure as the power supply, includes a knob to set the temperature of the aquarium water. A potentiometer, separated by the knob, is used to "dial-in" a representation of the desired temperature.

In a first preferred embodiment, the water temperature is controlled by turning on current to the resistive elements (the conductive film-coated glass) when the temperature of the water is below the "dialed-in" preset temperature and turning off the current to the resistive elements when the temperature of the water is above the "dialed-in" preset. This control approach will keep the temperature of the tank constant, however, the exact temperature is not known because the output supplied by the thermistor or thermocouple is an indication of relative temperature only. A separate thermometer is required as is the case with most aquariums.

In an alternate preferred embodiment, the temperature responsive element is initially characterized or calibrated such that certain resistance values are known to correspond to actual temperatures. The above described control scheme is incorporated, but a separate thermometer is not required.

In a further alternate preferred embodiment, a "proportional" control system is utilized. As the temperature of the water approaches that of the desired "dialed-in" temperature, the voltage (and hence the current) supplied to the resistive heating elements (tin oxide coated glass) is proportionally increased or decreased so as to obtain more accurate control.

Figure 2:
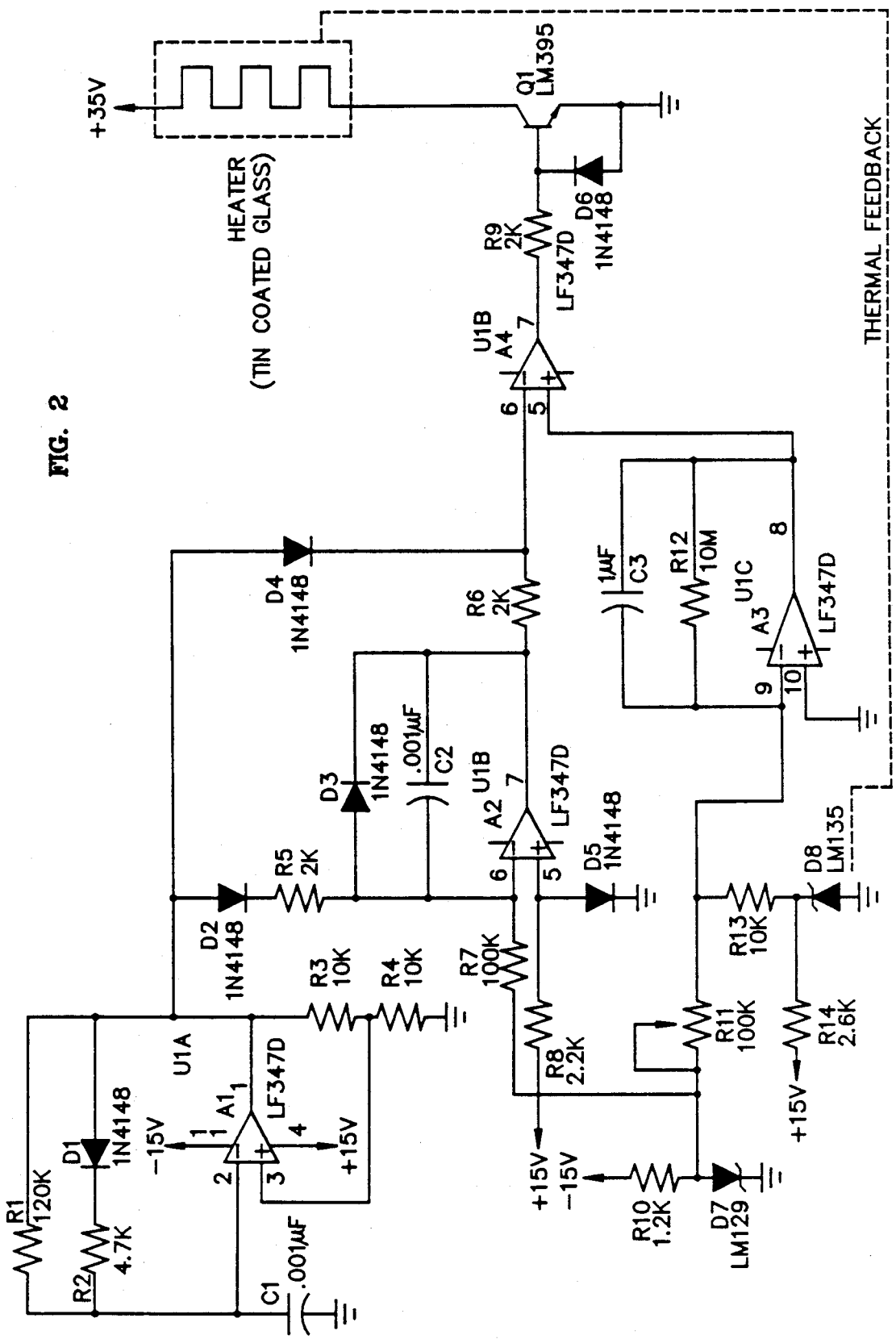
FIG. 2 is a schematic diagram of an electronic temperature controller which may be employed with the aquarium heater according to the present invention.

Referring now to FIG. 2, a typical temperature controller utilizing a pulse-width-modulation method of controlling is shown. The controller is built around an LF347 package. A1 functions as an oscillator whose output periodically resets the A2 integrator output back to zero volts. Each time A1's output goes high, a large positive current is forced into A2's summing junction, overcoming the negative current that flows through the 100K resistor into an LM129 reference. This forces A2's output to head in a negative-going direction, ultimately limited by the bound diode feedback. Another diode provides bias at A2's "+" input to compensate the bound diode and A2's output settles to very near zero volts. When the positive output pulse from A1 ends, the positive current into A2's summing junction ceases and A2's output ramps linearly until the next reset pulse.

A3 functions as a current summing servo-amplifier which compares the currents derived from an LM135 temperature sensor and the LM129 reference. In this example A3 operates at a gain of 1000 with a 1uF capacitor providing 0.1 Hz servo response. A3's output represents the amplified difference between the LM135's temperature and the desired control setpoint, which may be varied by adjusting a 100K pot R11. A3's output is compared to the ramp output of A2 and A4, which is set up as a comparator. A4's output will only be high during the time that A3's output is greater than the ramp voltage. The ramp reset pulse is diode-summed with the ramp output at A4 to prevent A4's output from going high during the period of the reset pulse. A4's output biases an LM395 power transistor which switches power to the heater.

Figure 3A:
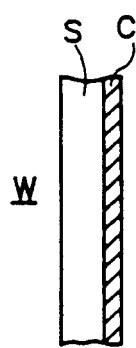
FIGS. 3A, 3B and 3C are cross-sectional diagrams showing different configurations of conductive coatings on glass or plastic sheet material.
Figure 3B:
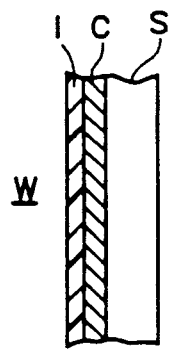
Figure 3C:
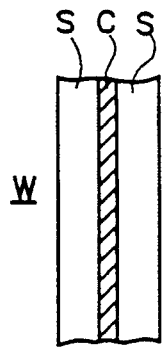

FIGS. 3A, 3B and 3C illustrate three different embodiments of conductive coatings on aquarium window glass or plastic sheet material. In each case, the sheet material is indicated by the letter S and the conductive coating is indicated by the letter C. A coating of insulating material is indicated by the letter I and the side of the sheet S on which the water is disposed is indicated by the letter W.

FIG. 3A shows the configuration on which the conductive coating C is arranged on the outside surface of the window sheet S.

FIG. 3B shows the coating C on the inside (water side) of the window sheet S covered by a transparent coating I of insulating film such as clear plastic.

FIG. 3C shows the conductive coating C sandwiched between two equally thick transparent sheets S.

Figure 4:
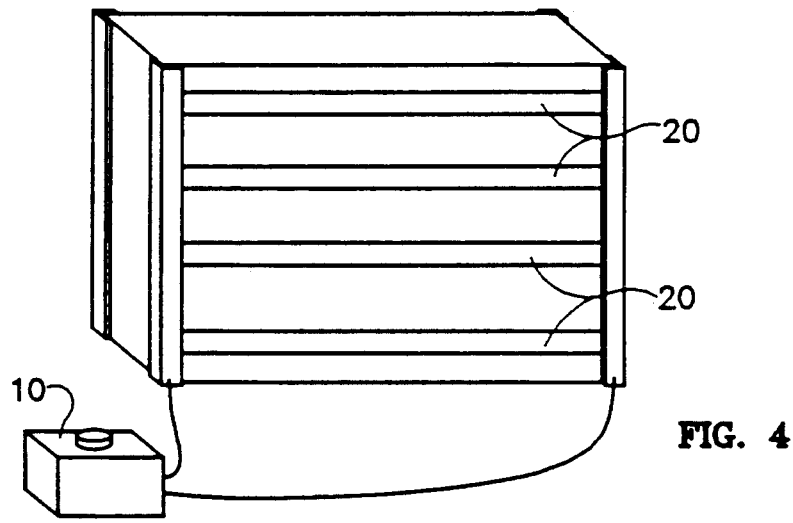
FIG. 4 is a perspective view of a fish tank having conductive strip heating elements arranged on at least one side panel in accordance with the present invention.

FIG. 4 illustrates an alternate embodiment of the present invention whereby the conductive coating is arranged in strips on at least one side panel of an aquarium. In this embodiment, the power supply 10 provides a D.C. voltage to the corner members 11 and 12 which are in electrical contact with the conductive coating strips 20. These strips produce heat when current is passed through them in the same manner as does the area conductive coating illustrated in FIG. 1.

There has thus been shown and described a novel aquarium heater which fulfills all the objects and advantages sought therefore. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. In combination apparatus for heating water in a rectangular aquarium, said aquarium having a multiplicity of viewing windows wherein at least of one said viewing window comprises
   a deposition of transparent conductive coating on the surface of said viewing window,
   a sheet of insulating film to cover, protect, and isolate said deposition of transparent conductive film,
   an electrode means connected to said deposition for applying an electric voltage across separated points of said coating,
   a power supply means supplying potential to said electrode means,
   a floating DC voltage output in the range of 10 to 50 volts emanating from said power supply which is converted from 110 volt AC line current,
   so that the power dissipated in said deposition on said viewing window heats said water and is operated at an electrical potential so as not to constitute a shock hazard.

* * * * *